United States Patent
Zhu et al.

(10) Patent No.: US 7,012,887 B2
(45) Date of Patent: Mar. 14, 2006

(54) METHOD FOR RESTORING DIVERSELY ROUTED CIRCUITS

(75) Inventors: Jack Zhu, Westford, MA (US); Alok Kishore Bhargava, Burlington, MA (US); Ray Alexander Balogh, North Andover, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 860 days.

(21) Appl. No.: 09/851,555

(22) Filed: May 8, 2001

(65) Prior Publication Data

US 2002/0167895 A1    Nov. 14, 2002

(51) Int. Cl.
*H04L 12/28*    (2006.01)
*H04J 1/16*    (2006.01)
*G06F 11/00*    (2006.01)
*G08C 15/00*    (2006.01)
*G01R 31/08*    (2006.01)

(52) U.S. Cl. .................. 370/216; 370/224; 370/389
(58) Field of Classification Search ........ 370/216–227, 370/244–254, 389–401, 238; 714/2–4, 43, 714/232
See application file for complete search history.

(56) References Cited

U.S. PATENT DOCUMENTS

| | | | | |
|---|---|---|---|---|
| 5,159,595 A | * | 10/1992 | Flanagan et al. | 370/224 |
| 5,793,745 A | * | 8/1998 | Manchester | 370/224 |
| 5,832,197 A | * | 11/1998 | Houji | 714/4 |
| 5,835,482 A | * | 11/1998 | Allen | 370/225 |
| 6,205,562 B1 | * | 3/2001 | Fukushima et al. | 714/43 |
| 6,215,765 B1 | * | 4/2001 | McAllister et al. | 370/217 |
| 6,269,452 B1 | * | 7/2001 | Daruwalla et al. | 714/4 |
| 6,272,107 B1 | * | 8/2001 | Rochberger et al. | 370/216 |
| 6,643,464 B1 | * | 11/2003 | Roorda et al. | 398/59 |
| 6,763,190 B1 | * | 7/2004 | Agrawal et al. | 398/5 |
| 2001/0038471 A1 | * | 11/2001 | Agrawal et al. | 359/110 |
| 2002/0097671 A1 | * | 7/2002 | Doverspike et al. | 370/216 |
| 2003/0031127 A1 | * | 2/2003 | Saleh et al. | 370/228 |

* cited by examiner

*Primary Examiner*—Man U. Phan
(74) *Attorney, Agent, or Firm*—Lahive & Cockfield, LLP

(57) ABSTRACT

A method and apparatus for restoring a diversely routed circuit in a timely manner from an initial path failure includes the steps of receiving one or more triggers at one of a destination node and a source node of a first path. The trigger indicates a path failure. The method continues by switching from the first path to a functional second path. The trigger prompts, at least partially, the switching step, and restores the circuit to a functional mode.

31 Claims, 4 Drawing Sheets

METHOD FOR RESTORING DIVERSELY ROUTED CIRCUITS

FIELD OF THE INVENTION

The invention relates to a method for restoring diversely routed circuits from a failure mode, and more particularly relates to using trigger mechanisms to detect and carry path failure conditions, initiate switching of paths, and initiate repair and restoration of failed paths.

BACKGROUND OF THE INVENTION

Network systems exist in a number of different formats and protocols, and in a variety of different technology areas. Some of these network systems have built-in systems and methods for identifying failures within the network. Additionally, some network systems also attempt to re-route signals propagating through the network to avoid any revealed problems or failures.

One known network system, called Synchronous optical network (SONET), is a standard for optical telecommunications transport. The Exchange Carriers Standards Association for the American National Standards Institute defines one version of SONET protocol. The comprehensive SONET standard provides the transport infrastructure for worldwide telecommunications. SONET defines a technology for carrying many signals of different capacities through a synchronous, flexible, optical hierarchy. This is accomplished by means of a byte-interleaved multiplexing scheme. Byte-interleaving allows bytes from multiple different sources to be combined in a single system without losing track of each byte, and simplifies multiplexing because it offers a method by which each byte can be tracked.

SONET based systems can experience circuit failures from time-to-time. The term "circuit" as utilized herein shall mean a discernable path or route between a source node and a destination node. The circuit may or may not include intermediate nodes between the source node and the destination node. The circuit is disposed within a mesh topology as understood by one of ordinary skill in the art.

A common issue in current network schemes is the detection and correction of a failure along the path of an established circuit. If a failure occurs along the path, a network scheme must be able to identify or detect the failure condition and communicate the failure condition to the source of the circuit so that circuit protection/restoration action can quickly and efficiently be taken.

Other known network protocols include O Optical Network Protocols, and IP Network Protocols, which are understood by those of ordinary skill in the art.

One method for handling failures along a path of an established circuit is the use of a signaling protocol such as the label distribution protocol (LDP), or the Resource ReSerVation Protocol (RSVP). As utilized herein, the term label refers to a short, fixed length identifier used to determine the forwarding of a packet using an algorithm. The label is usually rewritten during forwarding. Label values are typically local to a single data link. A label switching device will usually replace the label in a packet with a different label prior to forwarding the packet to the next location. The label switching forwarding component uses a single forwarding algorithm in the form of forwarding tables based on label swapping to decide where to send the packets. The label distribution protocol is the standard by which label bindings distribute. The term label binding is an association between a label and a forwarding equivalence class (FEC), which can advertise to neighbors to establish a label switched path. The term forwarding equivalence class refers to a set of packets handled equivalently for the purposes of forwarding, and thus suitable for binding to a single label. Network layer routing protocols provide label switching routers with the mapping between FECs and a next forwarding address. The label binding information provides the label switching routers with the FECs and the labels. The two mappings combined provide the necessary information for forming the forwarding tables used by the label switching forwarding component.

If there is a failure along the path of an established circuit, the immediate node proximal to the failure must first successfully detect the failure. Once detection occurs, the node forwards an LDP message to the source of the circuit. In most instances, the mechanism by which the LDP message transports will require a period greater than 50 milliseconds. It is preferable in certain applications to receive notice of a failure and take action on that failure in a time less than 50 milliseconds from the initial failure.

SUMMARY OF THE INVENTION

There exists in the art a need for a circuit failure/restoration process, which enables implementation of that process in a timely manner, which in some instances can mean less than e.g., 50 milliseconds from an initial path failure. The present invention represents further solutions in this art.

A method for restoring a diversely routed circuit includes the steps of receiving one or more triggers at one of a destination node and a source node of a first path. The triggers indicate a path failure. The method continues by switching from the first path to a functional second path. The triggers prompt, at least partially, the switching step, and restore the circuit to a functional mode.

According to one aspect of the present invention, the method further includes the step of detecting a path failure condition in a first path and initiating and sending one or more triggers in a first direction along the first path to signal the path failure condition. The method can further include the step of initiating one or more triggers in a second direction along the first path. This initiation of one or more triggers in a second direction can occur substantially contemporaneous with the one or more triggers sent in the first direction along the first path. One or both of a source node and a destination node within the circuit ultimately receive the triggers.

According to one aspect of the present invention, a calculation executes according to a predetermined algorithm to determine whether to switch the particular source or destination node to a second path. If the algorithm requires a switch, and that the switch has not already occurred, the method includes the step of switching the particular source or destination node from the first path to a functional second path.

The triggers, according to further aspects of the present invention, can take many different forms, including path AIS messages, path RDI messages, LDP messages, and path Unequipped messages for signaling path failures.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1:
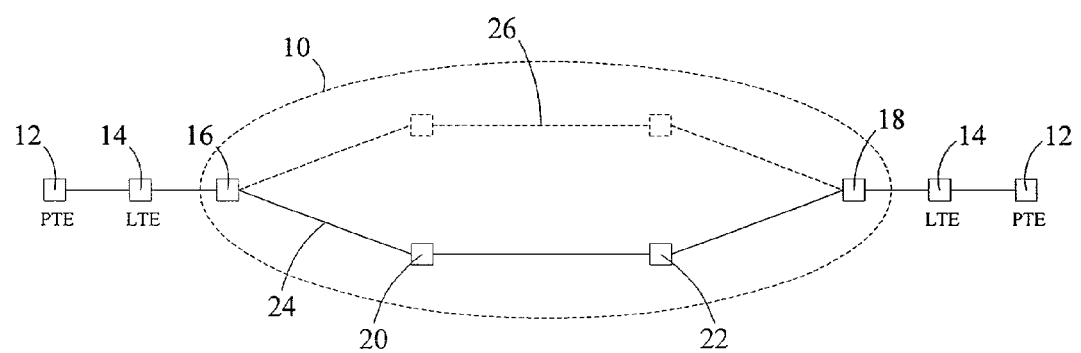
FIG. 1 is a schematic illustration of a circuit according to one embodiment of the present invention.

The present invention generally relates to a method of utilizing triggers to expedite restoration of diversely routed circuits, and subsequently repair or re-route the original failed circuit to form a new protect circuit. When a downstream egress switch detects a trigger on a working circuit, it can switchover to a protect circuit that has been set up a priori, if the trigger is not also present on the protect circuit. If the trigger is present in only one direction, the circuit may temporarily straddle both legs of the diversely routed path, one in each direction. However, the label withdraw/release will eventually reach the ingress/egress nodes, and signaling protocol at the end points will tear down the failed working path and ensure that the circuit rolls over to the protected circuit. The method further includes restoring the failed working circuit by either repairing the failed line or component, or calculating and implementing a new path to form a new protect circuit (the original protect path having changed status to being the working circuit).

The terms "downstream" and "upstream" refer to a direction of travel along a circuit path. Downstream is toward the destination of a path, while upstream is toward the source of a path. The terms "ingress" and "egress" refer respectively to input and output with regard to data or signals.

FIGS. 1 through 8, wherein like parts are designated by like reference numerals throughout, illustrate example embodiments of a method for restoring diversely routed circuits according to the present invention. Although the present invention will be described with reference to the example embodiments illustrated in the figures, it should be understood that many alternative forms can embody present invention. One of ordinary skill in the art will additionally appreciate different ways to alter the parameters of the embodiments disclosed, such as the size, shape, or type of elements or materials, in a manner still in keeping with the spirit and scope of the present invention.

As previously stated, the present invention relates to the use of triggers to expedite the restoration of diversely routed circuits. The term "trigger" shall include, but not be limited to, SONET path AIS, SONET path RDI, label switching protocols such as LDP, and the like. The following description and figures illustrate the specific examples of SONET path AIS and LDP messaging in a mesh topology network for the sake of clarity, however the spirit and scope of the present invention extend beyond the specific signals, protocols, and topologies discussed herein as understood by one of ordinary skill in the art.

FIG. 1 illustrates a diversely routed circuit 10. The phrase "diversely routed circuit" represents networks having a mesh topology that maintains two legs or paths between ends, one path being reserved as a protect path for the other, which is a working path. Path terminating equipment (PTE) 12 and line terminating equipment (LTE) 14 direct a path to and from the diversely routed circuit 10. The PTE 12 includes network elements such as fiber-optic terminating systems, which can access, generate, and process path overhead. SONET provides a significant amount overhead information, which is information sent in bytes relating to operations, administration, maintenance, and provisioning capabilities of the network. The overhead information is sent along with the data being transmitted. Path overhead is overhead that is accessed, generated, and processed by PTE. Path overhead generally includes nine bytes of STS path overhead and when the frame is virtual tributary (VT) structured, five bytes of VT path overhead. The LTE 14 includes network elements such as add/drop multiplexers or digital cross-connect systems that can access, generate, and process line overhead.

The diversely routed circuit 10 includes a source node 16 in communication with a destination node 18. A node can be any intelligent element or device for directing or forwarding data (e.g., switch, router, and the like). There is a first intermediate node 20 and a second intermediate node 22 arranged along a working path 24, which extends between the source node 16 and the destination node 18. One of many possible protect paths 26 also extends between source node 16 and destination node 18.

The source node 16 is generally the first node of a circuit through which a path enters, and the destination node 18 is generally the last node of the circuit 10 as the path travels. The intermediate nodes 20 and 22 generally represent nodes disposed between the source node 16 and the destination node 18 of any one diversely routed circuit 10. There can be greater or fewer numbers of intermediate nodes 20, 22 disposed between the source node 16 and the destination node 18 of a particular diversely routed circuit 10. There are only two intermediate nodes 20, 22 illustrated in the embodiments disclosed herein to simplify the explanation of various invention embodiments shown. The working path 24 extends between the source node 16 and the destination node 18, and represents the path by which information travels in a bi-directional manner. The protect path 26 that extends between the source node 16 and the destination node 18 represents one of a number of potential protect paths available to carry data between the source node 16 and the destination node 18, should a failure occur on the working path 24.

The present invention utilizes triggers, such as e.g., SONET path AIS for failure notification for diversely routed circuits. There are additional triggers in the form of, e.g., LDP messages to carry failure notification to the source node and the destination node. To suppress a false switchover due to a path AIS generated from outside a particular diversity routed circuit, or during initial circuit setup or switchover, a switch-disable flag is used. This flag is at both ends of the circuit, i.e., the source node 16 and the destination node 18, and is an indicator of a contemporaneous condition.

Figure 2:
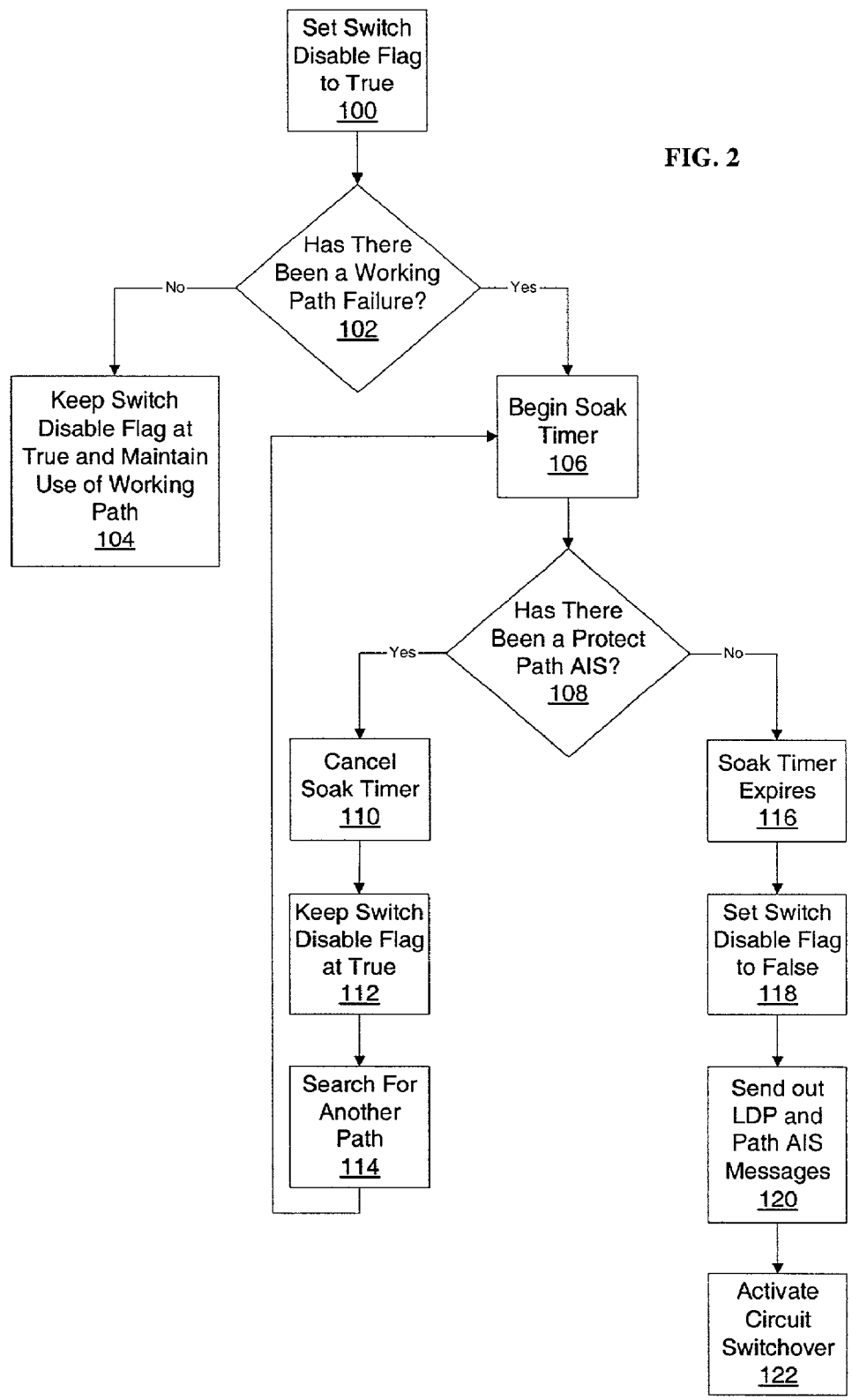
FIG. 2 is a flowchart indicating one combination of steps for carrying out one embodiment of the present invention.

The switch-disable flag, as shown in the flowchart illustration of FIG. 2 showing a basic implementation, is set to True at the source node 16 and the destination node 18 at the beginning of circuit setup or switchover (step 100). The source node 16 and the destination node 18 each monitor the path AIS. If there has not been a working path 24 failure at step 102, the switch disable flag remains at True and the source node 16 continues to use the working path 24 to communicate with the destination node 18.

If there has been a working path 24 failure at step 102, a soak timer begins running (step 106). While the soak timer is counting down a predetermined time period it is determined whether there has been a path AIS (step 108) along the potential protect path 26. If there has been a path AIS along the protect path 26, the soak timer is cancelled (step 110). The switch disable flag remains at True (step 112) to prevent a switchover from occurring, and the system searches for an alternate protect path (step 114) and re-starts the soak timer (step 106).

If there has not been a failure of the protect path 26, the soak timer eventually expires (step 116). The switch disable flag is then set to False (step 118) to enable a switchover at the next path AIS. Uni-directional trunk failure results in a path AIS sent downstream in one direction and an LDP message sent out by the node at the downstream end of the failed trunk. Bi-directional failure results in a path AIS sent out downstream in two directions, and an LDP message sent out by the nodes at both ends of the failed trunk. Detection of a path AIS or LDP message at the end nodes of a circuit, i.e., the source node 16 and the destination node 18, is the base for activating a circuit switchover.

LDP and path AIS messages are sent out across the network indicating the failure of the working path 24 (step 120). Activation of the circuit switchover ensues and the optical signal switches to the protect path 26 from the failed working path 24 (step 122).

The circuit switchover occurs routing the optical signal traffic from the working circuit to the protect circuit. At this point, the protect circuit becomes the working circuit and there is no more protect circuit. The system then restores the failed working circuit. The circuit restoration occurs in the following manner according to one embodiment of the present invention. A computation occurs to determine a viable new path. The computation can be either centralized or decentralized. A centralized computation occurs at a central controller that maintains global information regarding the network. A decentralized computation occurs at individual nodes, where each node calculates paths for traffic traveling through that particular node.

The decentralized approach most often occurs with a local restoration process. In local restoration, the nodes proximal to the point of failure initiate restoration action for all traffic affected by the failure. The centralized approach and the decentralized approach can both execute an end-to-end path based restoration. In an end-to-end path based restoration, the source node and the destination node supporting the affected traffic initiate the restoration of the path therebetween. Alternatively, the centralized and decentralized approaches can implement a hybrid based restoration, wherein aspects of both local and end-to-end initiate the restoration procedure.

The restoration techniques can occur in a discovery based manner in which the restoration occurs after failure of a path, or in a pre-computed manner in which restoration paths are computed prior to a failure and simply implemented should a failure occur. Discovery based restoration techniques can occur with a centralized or decentralized approach. Either approach calculates the restoration path in real time, after the failure occurs.

Figure 3:
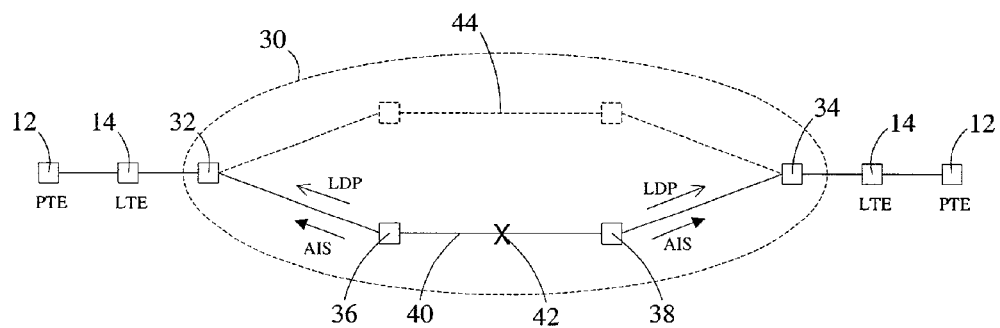
FIG. 3 is a schematic illustration of a dual-cast circuit according to one aspect of the present invention.

FIG. 3 illustrates a dual-cast circuit 30 with a bi-directional failure. The dual-cast circuit 30 includes, in addition to the PTE 12 and the LTE 14, a source node 32 in communication with a destination node 34. There is a first intermediate node 36 and a second intermediate node 38 located along a working path 40, which extends between the source node 32 and the destination node 34. A bi-directional failure 42 occurs between the first intermediate node 36 and the second intermediate node 38 along the working path 40. The bi-directional failure 42 occurs sending out path AIS messages in both directions along the working path 40 towards the source node 32 and the destination node 34. LDP messages will also result at the point of failure and travel to each of the source node 32 and the destination node 34. The path AIS reaches the source node 32 and the destination node 34 prior to the LDP messages and initiates a switchover from the failed working path 42 to the functional protect path 44, thus restoring the circuit 30. When the LDP message arrives after the path AIS, switchover is already complete based on the path AIS. The source node 32 and the destination node 34 then determine that the switchover from the failed working path 40 to the protect path 44 has already occurred and ignore the LDP messages.

The path AIS travels through the SONET structure more quickly than the LDP messages. This results in a switchover from the failed working path 40 to the functional protect path 44 more quickly and efficiently than if the source node 32 and the destination node 34 had waited for the LDP messages to arrive prior to initiating the switchover and restoring the circuit.

Figure 4:
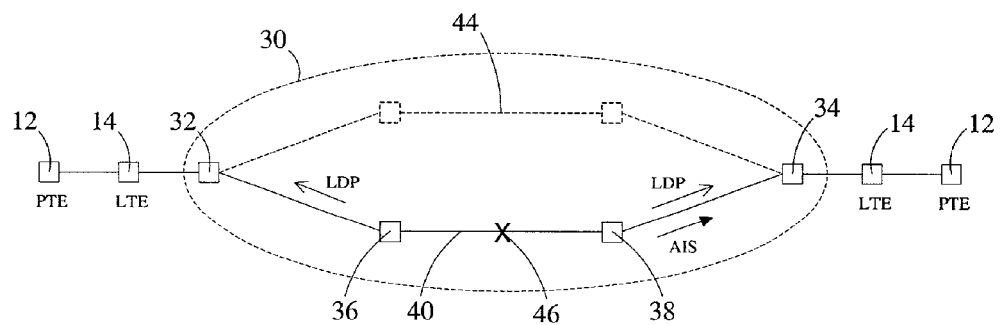
FIG. 4 is a schematic illustration of a dual-cast circuit according to still another aspect of the present invention.

FIG. 4 illustrates the dual-cast circuit 30 of FIG. 3 with a uni-directional failure 46. The path AIS departs in one direction from the unidirectional failure 46 downstream from the failure toward the destination node 34 because of the path disruption in the other direction. Contemporaneously, the LDP messages depart from the unidirectional failure 46 to both the source node 32 and the destination node 34. The destination node 34 receives the path AIS before the LDP message and initiates a switchover. The other LDP message subsequently reaches the source node 32, at which time the switchover has already occurred. During the time in between the switch over and the arrival of the LDP message at the source node 32, one direction of traffic takes the failed working path 40 in the still working direction, while the other direction of traffic takes the protected path 44.

Figure 5:
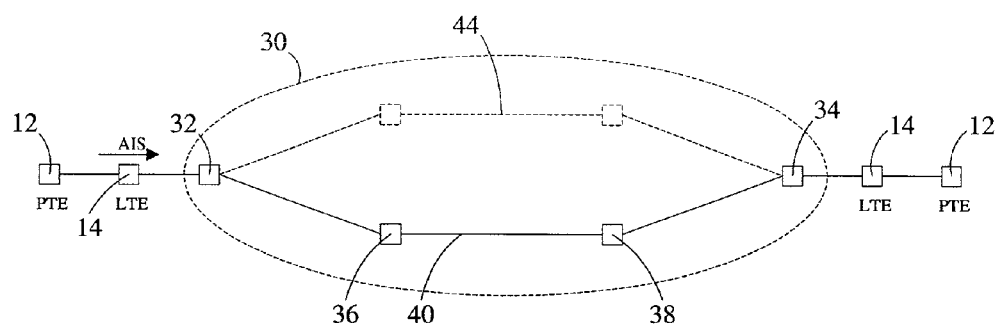
FIG. 5 is a schematic illustration of a dual-cast circuit according to yet another aspect of the present invention.

FIG. 5 illustrates the dual-cast circuit 30 of FIGS. 3 and 4 with a path AIS from outside the dual-cast circuit 30. The path AIS enters from outside the dual-cast circuit 30 and is dual-cast on both the working path 40 and the protect path 44. The path AIS is detected on both the working path 40 and the protect path 44 substantially simultaneously. There is no switchover in this instance, and no LDP messages generate.

Figure 6:
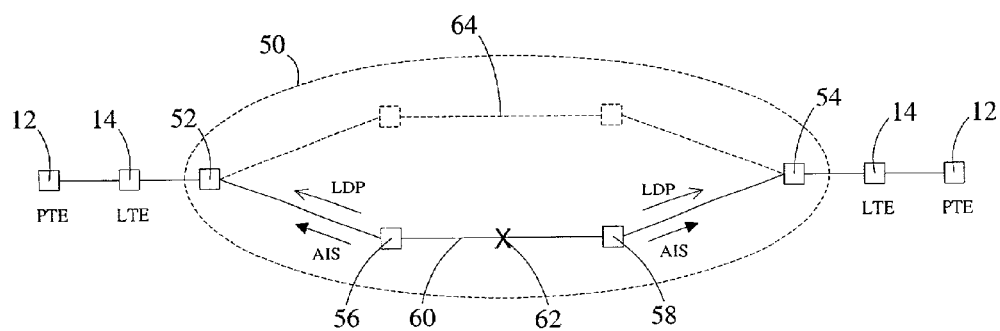
FIG. 6 is a schematic illustration of a uni-cast circuit according to one aspect of the present invention.

FIG. 6 illustrates a uni-cast circuit 50 with a bi-directional failure. The uni-cast circuit 50 includes the PTE 12 and the LTE 14 in addition to a source node 52 and a destination node 54. A working path 60 extends between the source node 52 and the destination node 54. A first intermediate node 56 and a second intermediate node 58 lie along the working path 60 between the source node 52 and the destination node 54. A path AIS departs in both directions after a bi-directional failure 62 to each of the source node 52 and the destination node 54. The receipt of the path AIS initiates a switchover at both the source node 52 and the destination node 54. There can be a tiny window in which one end switches over but the other end has not yet switched. This causes a transitional path AIS. Because the switch-disabled flag equals true at the time of the switchover, it suppresses the second switchover until switching is complete at the other end, the circuit 50 is fully established, and the system clears the path AIS. Similar to the dual-cast circuit 30 bidirectional failures, the LDP messages also depart from the point of bi-directional failure 62 to each of the source node 52 and the destination node 54. These LDP messages are ignored due to the faster switchover based on the path AIS.

Figure 7:
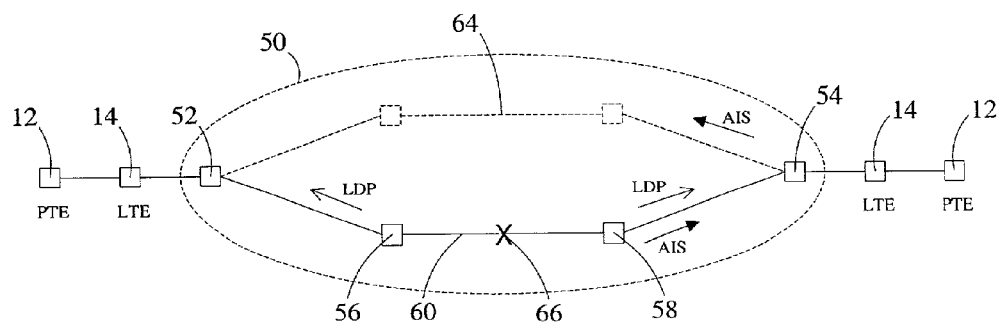
FIG. 7 is a schematic illustration of a uni-cast circuit according to still another aspect of the present invention.

FIG. 7 illustrates the uni-cast circuit 50 from FIG. 6 with a uni-directional failure. The path AIS departs downstream in only one direction from the uni-directional failure 66. The path AIS is received at the destination node 54. The destination node 54 initiates a circuit switchover from the working path 60 to the protect path 64. After the switchover, the failed working path 60 disconnects, which causes a path AIS to be sent in the other direction, the still working direction. When the path AIS reaches the source node 52, the source node 52 initiates a switchover to the protect path 64. LDP messages also depart from the unidirectional failure 66 to each of the source node 52 and the destination node 54, however the LDP messages are slower than the path AIS, and thus do not affect the switchover result.

Figure 8:
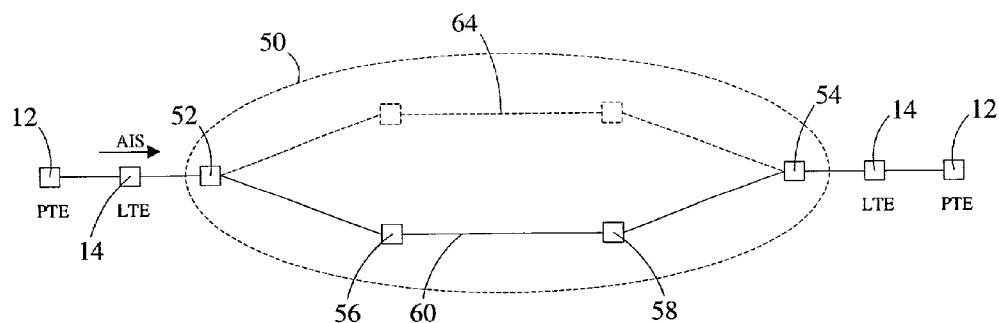
FIG. 8 is a schematic illustration of a uni-cast circuit according to yet another aspect of the present invention.

FIG. 8 illustrates the uni-cast circuit 50 of FIGS. 6 and 7 with a path AIS from outside of the uni-cast circuit 50. The path AIS from external to the uni-cast circuit 50 causes a false switchover. After the switchover, the path AIS still exists. There is no second switchover because the switch-disabled flag equals true immediately following the initial switchover. If the false switchover takes less than 50 milliseconds, the service is uninterrupted and transfers to the protect path 64. However, all preempted circuits that were running on the protect path 64 are bumped due to the false switchover and are re-routed.

The use of SONET path AIS expedites restoration of diversely routed circuits. When a downstream egress switch detects a path AIS on a working circuit, it switches to a protect circuit that has been set up previously. The circuit may temporarily straddle both legs of the diversely routed path, one in each direction, if the path AIS is present in only one direction. However, the label withdraw/release will eventually reach the ingress/egress nodes, and signaling protocol at the end points will tear down the failed working path and ensure that the circuit rolls over to the protected circuit.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A method for restoring a diversely routed circuit in a mesh network, comprising the steps of:
    initiating and sending one or more triggers in at least one of a first direction along said first path, a second direction along said first path, a first direction along said second path, and a second direction along said second path;
    receiving one or more triggers at one of a destination node and a source node of a first path, said one or more triggers indicating a path failure;
    determining whether a switch has occurred at one of said source and destination nodes, and calculating according to a predetermined algorithm whether to switch one of said source and destination nodes to a second path;
    when said algorithm calculates that a switch is required and that said switch has not already occurred, switching from said first path to a functional second path, prompted at least partially by said one or more triggers, to restore said circuit; and
    restoring said first path to a functional path.

2. The method according to claim 1, further comprising the step of detecting a path failure condition in said first path, prior to said receiving step.

3. The method according to claim 2, further comprising the step of initiating and sending one or more triggers in a first direction along said first path for signaling said path failure condition.

4. The method according to claim 1, further comprising the step of initiating and sending one or more triggers in a first direction along said first path for signaling said path failure condition, said initiating and sending step occurring prior to said receiving step.

5. The method according to claim 4, further comprising the step of initiating one or more triggers in a second direction along said first path, substantially contemporaneous with said one or more triggers sent in said first direction along said first path.

6. The method according to claim 5, further comprising the step of receiving said one or more triggers in said second direction of said first path at the other of said destination node and said source node.

7. The method according to claim 1, wherein said step of initializing and sending comprises the step of initiating and sending one or more LDP messages for signaling said path failure condition.

8. The method according to claim 1, wherein said step of initializing and sending comprises the step of initiating and sending one or more path AIS messages for signaling said path failure condition.

9. The method according to claim 1, wherein said step of initializing and sending comprises the step of initiating and sending one or more path Unequipped messages for signaling said path failure condition.

10. The method according to claim 1, wherein said step of restoring comprises repairing said path failure of said first path.

11. The method according to claim 1, wherein said step of restoring comprises calculating and implementing a new path between said source node and said destination node.

12. A method for restoring a diversely routed circuit in a mesh network, comprising the steps of:
    initiating and sending one or more triggers in a first direction along said first path and a second direction along said first path;
    receiving a path trigger at a destination node and a source node of a first path indicating a bi-directional failure in a diversely routed dual-cast circuit;
    determining whether a switch has occurred at one of said source and destination nodes, and calculating according to a predetermined algorithm whether to switch one of said source and destination nodes to a second path;
    when said algorithm calculates that a switch is required and that said switch has not already occurred, switching from said first path to a functional second path, prompted at least partially by said trigger, to restore said circuit; and
    restoring said first path.

13. The method according to claim 12, further comprising the step of detecting a path failure condition in said first path, prior to said receiving step.

14. The method according to claim 12, wherein said step of restoring comprises repairing said bi-directional failure of said first path.

15. The method according to claim 12, wherein said step of restoring comprises calculating and implementing a new path between said source node and said destination node.

16. A method for restoring a diversely routed circuit in a mesh network, comprising the steps of:
receiving a trigger at one of a destination node and a source node of a first path indicating a uni-directional failure in a diversely routed dual-cast circuit;
determining whether a switch has occurred at one of said source and destination nodes, and calculating according to a predetermined algorithm whether to switch one of said source and destination nodes to a second path;
when said algorithm calculates that a switch is required and that said switch has not already occurred, switching one of said destination node and said source node from said first path to a functional second path, prompted at least partially by said trigger, to restore said circuit; and
restoring said first path.

17. The method according to claim 16, further comprising the step of detecting a path failure condition in said first path, prior to said receiving step.

18. The method according to claim 17, further comprising the step of initiating and sending one or more triggers in a first direction along said first path for signaling said path failure condition, prior to said receiving step.

19. The method according to claim 16, wherein said step of restoring comprises repairing said uni-directional failure of said first path.

20. The method according to claim 16, wherein said step of restoring comprises calculating and implementing a new path between said source node and said destination node.

21. A method for restoring a diversely routed circuit in a mesh network, comprising the steps of:
receiving one or more triggers at a destination node and a source node of a first path indicating a bi-directional failure in a diversely routed uni-cast circuit;
determining whether a switch has occurred at one of said source and destination nodes, and calculating according to a predetermined algorithm whether to switch one of said source and destination nodes to a second path;
when said algorithm calculates that a switch is required and that said switch has not already occurred, switching from said first path to a functional second path, prompted at least partially by said one or more triggers, to restore said circuit; and
restoring said first path.

22. The method according to claim 21, further comprising the step of detecting a path failure condition in said first path, prior to said receiving step.

23. The method according to claim 22, further comprising the step of initiating and sending one or more triggers in a first direction and a second direction along said first path for signaling said path failure condition, prior to said receiving step.

24. The method according to claim 21, wherein said step of restoring comprises repairing said bi-directional failure of said first path.

25. The method according to claim 21, wherein said step of restoring comprises calculating and implementing a new path between said source node and said destination node.

26. A method for restoring a diversely routed circuit in a mesh network, comprising the steps of:
receiving one or more triggers at one of a destination node and a source node of a first path indicating a uni-directional failure in a diversely routed uni-cast circuit;
determining whether a switch has occurred at one of said source and destination nodes, and calculating according to a predetermined algorithm whether to switch one of said source and destination nodes to a second path;
when said algorithm calculates that a switch is required and that said switch has not already occurred, switching one of said destination node and said source node from said first path to a functional second path, prompted at least partially by said one or more trigger; and
restoring said first path.

27. The method according to claim 26, further comprising the step of detecting a path failure condition in said first path, prior to said receiving step.

28. The method according to claim 27, further comprising the step of initiating and sending one or more triggers in a first direction along said first path for signaling said path failure condition, prior to said receiving step.

29. The method according to claim 28, further comprising the step of switching the other of said destination node and said source node from said first path to said functional second path to restore said circuit.

30. The method according to claim 28, wherein said step of restoring comprises repairing said uni-directional failure of said first path.

31. The method according to claim 28, wherein said step of restoring comprises calculating and implementing a new path between said source node and said destination node.

* * * * *